United States Patent [19]

Armbrüster et al.

[11] Patent Number: 5,776,516
[45] Date of Patent: Jul. 7, 1998

[54] TWO-PLATEN INJECTION MOLDING MACHINE

[75] Inventors: Manfred Armbrüster, Schwaig, Germany; Robert Scott Betschman, Euclid; Richard D. Kimpel, Middleburg Heights, both of Ohio; Gerhard Schmidt, Wendelstein, Germany

[73] Assignee: Mannesmann Aktiengesellschaft, Dusseldorf, Germany

[21] Appl. No.: 700,675

[22] Filed: Aug. 12, 1996

[51] Int. Cl.[6] .................................. B29C 45/80
[52] U.S. Cl. .................................. 425/150; 425/589
[58] Field of Search .................................. 425/589, 150

[56] References Cited

U.S. PATENT DOCUMENTS

| | | | |
|---|---|---|---|
| 5,338,171 | 8/1994 | Hayakawa et al. | 425/589 |
| 5,582,782 | 12/1996 | Kato et al. | 425/150 |

OTHER PUBLICATIONS

Hydraulic and Pneumatic Power and Control, pp. 89–95, 1966.

*Primary Examiner*—Tim Heitbrink
*Attorney, Agent, or Firm*—Cohen, Pontani, Lieberman & Pavane

[57] ABSTRACT

A two-platen injection molding machine with a stationary mold carrier plate and a movable mold carrier plate which are connected via tiebars having piston-cylinder units which build up and cancel the clamping force. At least one driving cylinder is arranged at the carrier plates for quick driving movement thereof. The tiebars are constructed as loose clamping pins forming the piston rod of the piston-cylinder units. The tiebars are guided through the movable mold carrier plate and the stationary mold carrier plate, and have a hydraulic high-pressure closing unit and a quick-locking mechanism mounted thereon external to the mold carrier plates. Elements are provided which detect the position of the movable mold carrier plate in a defined manner and control the quick-locking mechanism the closing unit, and the driving cylinder.

10 Claims, 3 Drawing Sheets

5,776,516

1

TWO-PLATEN INJECTION MOLDING MACHINE

BACKGROUND OF THE INVENTION

1. Field of the Invention

The invention is directed to a two-platen injection molding machine with a stationary mold carrier plate and a movable mold carrier plate which are connected via tiebars having piston-cylinder units which build up and cancel the clamping force. At least one driving cylinder is arranged at the tiebars for quick driving movement.

2. Description of the Prior Art

DE 30 34 024 C2 shows an injection molding machine in which columns are arranged in the movable die clamping platen so as to be adjustable in the longitudinal direction by means of column nuts for adapting to the daylight or die installation height. At the ends of the columns facing the stationary die clamping platen, the columns have outer claws which are shaped like ring segments and are suitable for rotational coupling.

A disadvantage in this injection molding machine is that steps are required precisely to ensure that the tiebars are rotationally fixed. Further, due to the interrupted coupling surfaces and their inclination, large tiebar diameters are required which lead to an unwanted restriction of the die installation space.

DE 195 05 089 shows a process for actuating the closing device of a two-platen injection molding machine which makes use of a synchronous cylinder which is acted upon equally on both sides by high pressure. This high pressure is equal to or greater than the pressure required for exerting the nominal clamping force.

The process known from this reference has the disadvantage that the driving movement of the movable platen is always effected with closing cylinders which are pretensioned under high pressure. Accordingly, there is a considerable risk of damage to and consequently failure of the cylinder seal. This results in leakage and high wear at the seals. Further, the rods of the tiebars forming the closing cylinders are in the work region of the dies. On the whole, this design concept is expensive and cumbersome. This is particularly evident in the very large cylinders required for the process.

SUMMARY OF THE INVENTION

Accordingly, it is an object of the present invention to provide a simply designed, economical and environmentally sound two-platen injection molding machine whose hydraulic system requires only small amounts of circulating oil and which allows the greatest possible free space when the mold closing unit is open.

Pursuant to this object, and others which will become apparent hereafter, one aspect of the present invention, in a two-platen injection molding machine, resides in the tiebars being designed as clamping pins and the piston rods being guided through both mold carrying plates. A high-pressure closing unit is provided at one end of each tiebar and a quick-locking mechanism is provided at the other end of each tiebar external to the mold carrier plates. Elements are also provided which directly or indirectly detect the exact position of the movable mold carrier plate.

A driving cylinder which is provided independently of the closing cylinders is used for the normal opening and closing process. The closing cylinders, which are preferably hydraulic synchronous cylinders, are at rest during this driving

2 movement. Not only is energy saved in this way, but there is no generation of environmentally objectionable noise.

Shortly before the mold carrier plates achieve their closed position, the hydraulic equipment for the closing unit and quick-locking mechanism is actuated while being monitored by a path measurement system. Position detection can be effected for this purpose via a continuous electrical path measurement or by means of a stop of the piston rod connected with the movable mold carrier plate. If a stop is used, this stop can be employed as a shock absorber which dampens the collision impact of the movable mold carrier plate when closing.

The piston of the synchronous cylinder is kept extremely short, since it is used exclusively for the closing process. Due to its short length the piston need only travel a minimal path so that wear on the piston rod is especially light and the seals are only exposed to minimal wear.

The different die heights are adjusted by means of a quick-locking mechanism having locking elements which engage in grooves provided at the head end of the piston rod. The locking mechanism can be formed of a frictional-locking clamping unit which fixes the piston rod at an optional position. This quick-locking mechanism, which is designed as a clamping sleeve, is directly coupled with the path measurement system.

The quick-locking mechanism and the high-pressure closing unit can be arranged at the stationary mold carrier plate or at the movable mold carrier plate. In an advantageous embodiment of the invention, the quick-locking mechanism and the closing unit are arranged at one end of the tiebars which are constructed as clamping pins. At the other end of the tiebars is a thread on which an adjusting nut can be screwed. The quick-locking mechanism is designed as a coupling and accordingly not only allows a quick disengagement, but also a simple uncoupling of the tiebar part provided with the adjusting nut.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
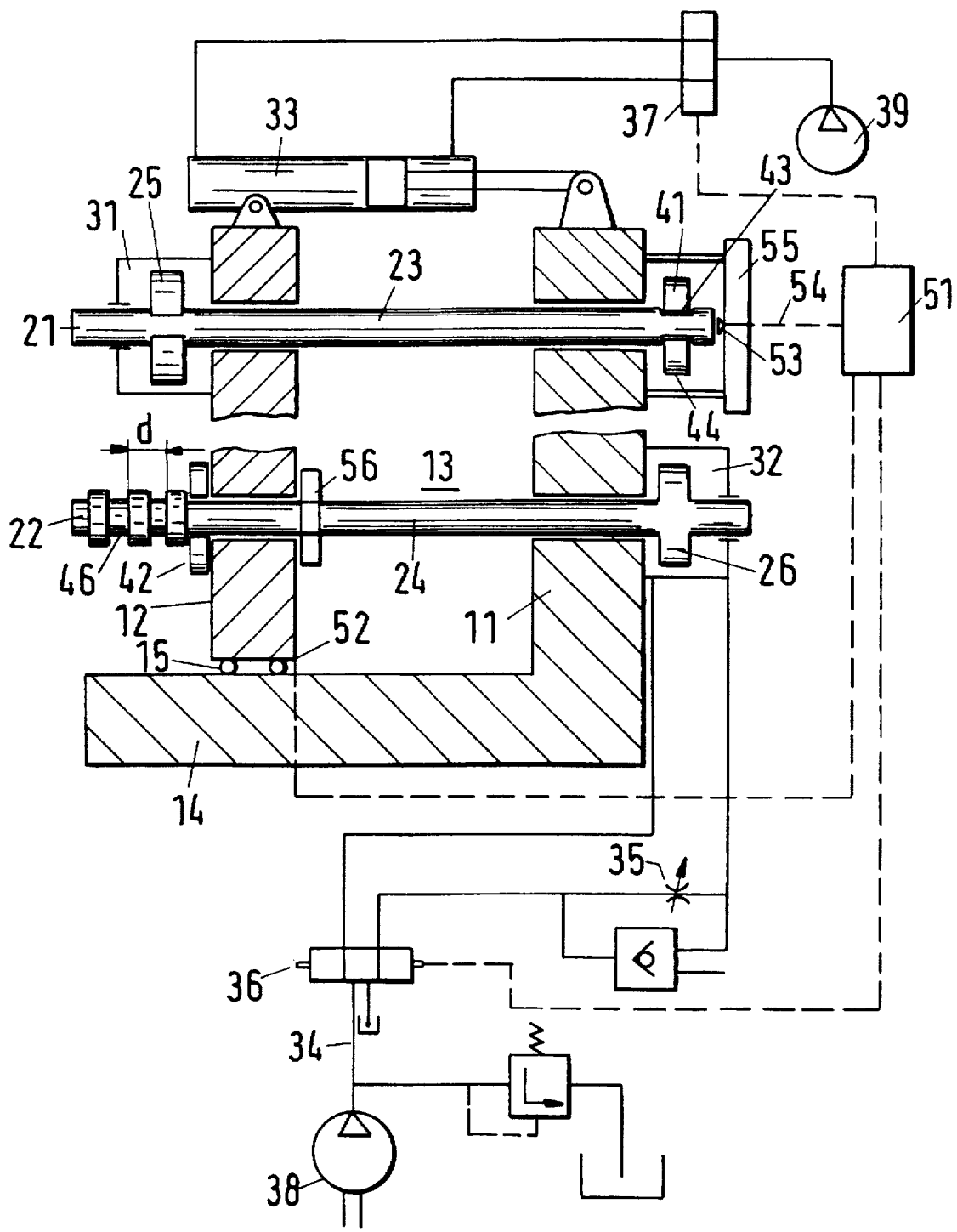
FIG. 1 is a schematic diagram showing a two-platen injection molding machine pursuant to the present invention.

FIG. 1 shows a two-platen injection molding machine with a stationary mold carrier plate 11 and a movable mold carrier plate 12 which define a die space 13 therebetween. The stationary mold carrier plate 11 is connected directly with the machine bed 14.

The machine shown in the drawings has tiebars 21, 22 with piston rods 23, 24. Each of the piston rods 23, 24 has at a first end at which a high-pressure closing unit 31, 32 is provided and a second end at which a quick-locking mechanism 41, 42 is provided. A groove 43 is provided in the first piston rod 23 at the second end so that locking elements 44 of the quicklocking mechanism 41 can engage therein. A plurality of grooves 46 are provided in the second end of the second piston rod 24. The distance between the grooves in the second piston rod 24 is designated "d" and corresponds to the planned graduation of the mold width of the die. Pistons 25, 26 of the synchronous cylinders are located in the high-pressure closing devices 31, 32.

The movable mold carrier plate 12 is connected with the stationary carrier plate 11 via a driving cylinder 33 for fast driving movement. The movable mold carrier plate 12 is supported via bearings 15 on the machine bed 14 so as to be movable.

The high-pressure closing units 31, 32 and the driving cylinder 33 are connected with hydraulic pumps 38, 39 via a switching valve 36 and a switching valve 37, respectively. A throttle 35 is provided in the hydraulic circuit 34 connecting the pump 38 to the high-pressure closing units 31, 32. Further, the hydraulic system can have other conventional elements which are known and thus not shown, such as a check valve and pressure control valve.

A direct path-measurement element 52 is provided at the movable mold carrier plate 12 and, along with an indirect path measuring element 53 which is arranged at a stop plate 55 provided for the second end of the first piston rod 23, communicates with a measuring and regulating device 51 via a measurement line 54. Further, a stop collar 56 is arranged at the second piston rod 24 on an opposite side of the movable mold carrier plate 12 from the quick locking mechanism 42.

Figure 2:
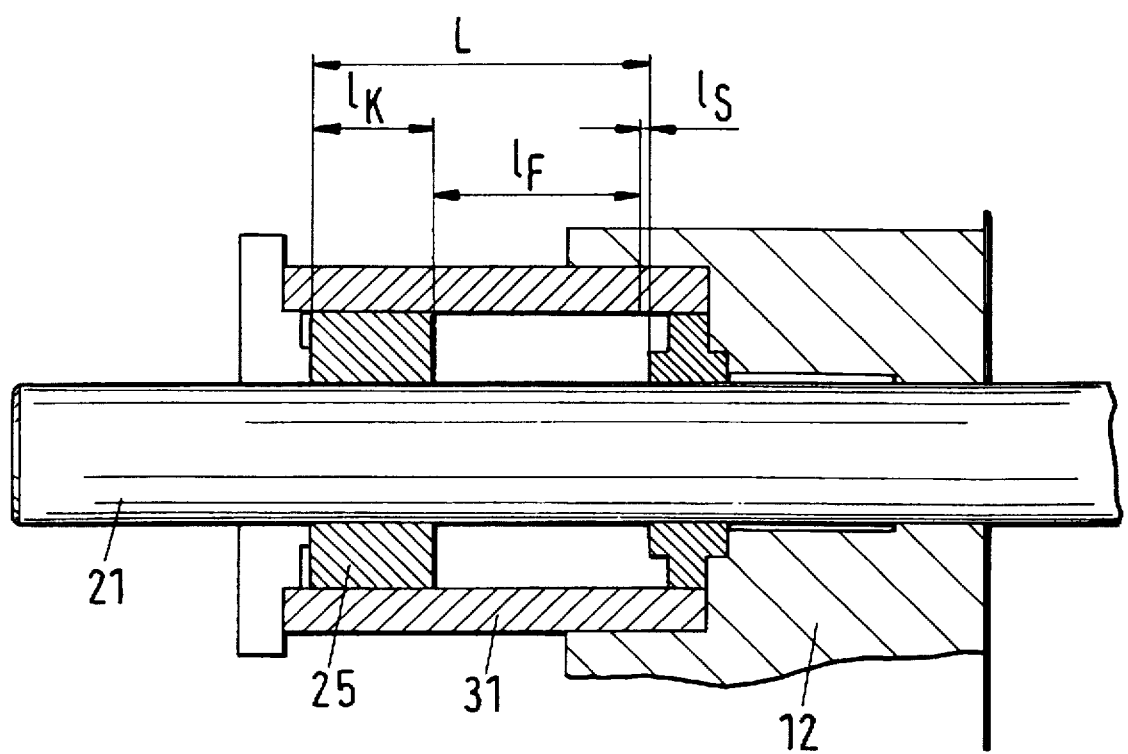
FIG. 2 shows a detail of a high-pressure closing device.

FIG. 2 shows a detailed view of a high-pressure closing device 31 which is constructed as a synchronous cylinder with the tiebar 21 which is guided through the movable mold carrier plate 12. The piston rod 23 is fastened to the tiebar 21. The thickness of the piston 25 is designated $1_K$. In addition to the path $1_F$ for the application of force when closing the mold carrier plates, the required path $1_S$ (tolerance) of the closing device is also shown. This path $1_S$ is required so that the quick-locking mechanism 41 can act, without hindrance, in the groove 43 at the other head end of the tiebar 21.

Figure 3:
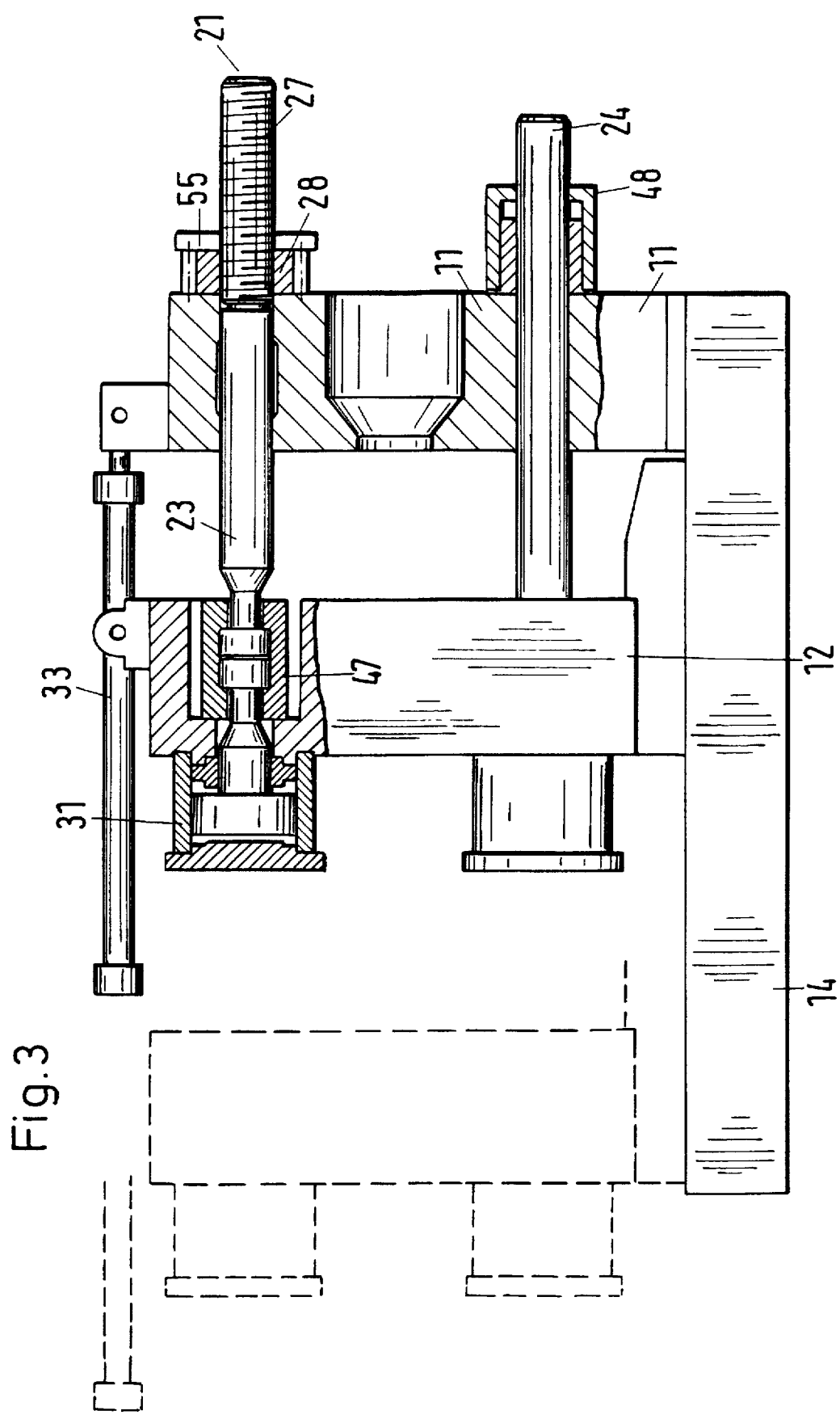
FIG. 3 is a schematic diagram showing a two-platen injection molding machine with a quick-locking coupling.

By way of supplementing FIG. 1, FIG. 3 shows the quick-locking mechanism in the form of a coupling 47. The first piston rod 23 has, at one end, a thread 27 on which a nut 28 is screwed for adjusting the die space.

As is also shown by way of supplementing FIG. 1, the second piston rod 24 can be locked quickly by means of a clamping sleeve 48.

FIG. 3 also shows the "open" (dashed lines) and "closed" locking positions.

The invention is not limited by the embodiments described above which are presented as examples only but can be modified in various ways within the scope of protection defined by the appended patent claims.

We claim:

1. A two-platen injection molding machine, comprising: a stationary mold carrier plate; a movable mold carrier plate; a tiebar arrangement including tiebars arranged to connect the stationary mold carrier plate to the movable mold carrier plate so as to define a die space between the mold carrier plates, piston-cylinder means for building up and cancelling clamping force between the carrier plates, and at least one driving cylinder arranged for quick driving movement, the piston-cylinder means including a first piston cylinder unit having a first piston rod and a second piston cylinder unit having a second piston rod, the tiebars being configured as loose clamping pins that form the piston rods of the piston-cylinder units, the movable mold carrier plate and the stationary mold carrier plate being configured to guide the tiebars therethrough; a hydraulic high-pressure closing means provided at a first end of the piston rods for closing the piston rods; quick-locking means external to the mold carrier plates for locking the piston rods; means for detecting position of the movable mold carrier plate in a defined manner and controlling the quick-locking means, the closing means and the driving cylinders, each of the piston-cylinder units having a synchronous cylinder with a length L corresponding to the following formula:

$$L=1 \text{ to } 1.2\times(1_F+1_S+1_K),$$

where $1_F$ is a length of a path for application of force when closing the mold carrier plates, $1_S$ is a required path (tolerance) of the locking means, and $1_K$ is a thickness of the piston of the piston-cylinder unit, the quick-locking means being provided on an end of the piston rods; and stop members provided so that the end of the piston rods on which the quick-locking means are provided contacts the stops when the mold plates are moved together.

2. A two-platen injection molding machine according to claim 1, wherein the quick-locking means are arranged at a side of the mold carrier plate which lies opposite to the closing means and faces away from the die space.

3. A two-platen injection molding machine according to claim 1, wherein the quick-locking means includes a groove in a second end of the first piston rod of the first closing means and locking elements engagable in the groove.

4. A two-platen injection molding machine according to claim 2, wherein the quick-locking means includes a groove in a second end of the first piston rod of the first closing means and locking elements engagable in the groove.

5. A two-platen injection molding machine according to claim 3, wherein a plurality of grooves are provided in the second piston rod at a distance from one another corresponding to a planned mold width graduation.

6. A two-platen injection molding machine according to claim 4, wherein a plurality of grooves are provided in the second piston rod at a distance from one another corresponding to a planned mold width graduation.

7. A two-platen injection molding machine according to claim 1, wherein the closing means includes a hydraulic circuit arranged to supply hydraulic fluid to the closing means, and a throttle arranged in the hydraulic circuit so as to dampen impacts when the piston rod strikes the stop member.

8. A two-platen injection molding machine according to claim 1, wherein the closing means and the quick-locking means are provided at a common end of the tiebars, each tiebar having a thread at an opposite end, and further comprising an adjusting nut cooperatively engaged with the thread.

9. A two-platen injection molding machine according to claim 8, wherein the quick-locking means is a coupling arranged to detachably connect the tiebar to the closing means.

10. A two-platen injection molding machine according to claim 1, wherein the quick-locking means includes a clamping sleeve arranged at the second end of the second one of the piston rods.

* * * * *